Patented Apr. 6, 1948

2,439,204

UNITED STATES PATENT OFFICE 2,439,204

PARA-ACETYLBENZYL COMPOUNDS

William S. Emerson, Dayton, Ohio, assignor to Monsanto Chemical Company, St. Louis, Mo., a corporation of Delaware No Drawing. Application June 22, 1946, Serial No. 678,672

9 Claims. (Cl. 260—483)

The present invention relates to new para-substituted benzyl compounds and to the preparation of such materials. It provides an efficient and inexpensive method whereby para-acetylbenzyl acetate may be derived from para-ethylbenzyl acetate. This is particularly valuable in that the latter material may be secured through para-ethylbenzyl chloride from ethylbenzene, which has become a convenient source material.

An object of the invention is to provide materials usable as intermediates for the production of polymeric substances, as is disclosed in my copending application Serial No. 678,673, filed June 22, 1946. This carries the para-(alpha-oxyethyl) benzyl acetate product of the instant case to para-vinylbenzyl acetate.

The following examples illustrate an embodiment of the preparation and properties of the chemical compounds which comprise the instant invention.

*Para-ethylbenzyl chloride.*—In a one-liter, 3-necked flask, equipped with a stirrer, thermometer, gas inlet and reflux condenser, were placed 800 cc. of ethylbenzene, 600 g. of paraformaldehyde, and 40 g. of fused and pulverized zinc chloride. While this mixture was stirred as vigorously as possible and the internal temperature was held at 66–69° a vigorous stream of hydrogen chloride was introduced until the mixture was saturated. At this point the flow was moderated so that hydrogen chloride evolved slowly from the top of the condenser. The total reaction time was one hour. The hydrogen chloride flow was then stopped and the reaction mixture cooled to 25°. After pouring into a one-liter separatory funnel the mixture was separated into two layers and the ethylbenzene was transferred to another separatory funnel to free it from any zinc chloride adhering to the sides of the original funnel. The ethylbenzene solution was washed six times with water and then dried over sodium sulfate. Distillation yielded 222 g. (71% based on formaldehyde) of para-ethylbenzyl chloride, B. P. 94–100° C./11 mm. (literature value 106–110°/15 mm.), $n_D^{25}$ 1.5293.

*Para-ethylbenzyl acetate.*—A mixture of 110 g. of fused sodium acetate, 800 cc. of glacial acetic acid and 223 g. of para-ethylbenzyl chloride was refluxed for 30 minutes. Upon cooling, the precipitated sodium chloride was removed by filtration, washed with 200 cc. of glacial acetic acid, and these washings together with 25 g. of fused sodium acetate were added to the filtrate. This was then refluxed for an additional 2½ hours before dilution with water and removal of the product by benzene extraction. Distillation of this extract yielded 238 g. (93%) of para-ethylbenzyl acetate, B. P. 117–127° C./14 mm., $n_D^{25}$ 1.5013. An analytical sample of the compound boiled at 130–132° C./15 mm., $n_D^{25}$ 1.5042, $$d_{25}^{25}\ 1.028$$

Anal.: Calcd. for $C_{11}H_{14}O_2$: C, 74.3; H, 7.86.
Found: C, 73.9; H, 7.91.

*Para-acetylbenzyl acetate.*—A vigorous stream of air was introduced through an alundum disperser into a mixture of 485 g. of para-ethylbenzyl acetate, 5 g. of chromium oxide and 20 g. of calcium carbonate held at 130–140° for 28 hours. Upon cooling, the catalyst was removed by filtration and the filtered product was then refluxed for two hours with 10 g. of sodium acetate and 100 cc. of acetic anhydride. After dilution with water, the product was extracted with benzene and distilled to give 287 g. (59% recovery) of para-ethylbenzyl acetate, B. P. 119–129°/12 mm., $n_D^{25}$ 1.5011 and 118 g. (23% conversion and 55% yield) of para-acetylbenzyl acetate, B. P. 155–185° at 12 mm., $n_D^{25}$ 1.5225. An analytical sample boiled at 161–163°/11 mm., $n_D^{25}$ 1.5225, $$d_5^5\ 1.126$$

Anal.: Calcd. for $C_{11}H_{12}O_3$: C, 68.8; H, 6.25.
Found: C, 68.9; H, 6.66.

The 2,4-dinitrophenylhydrazone melted at 182–183° after one crystallization from ethyl acetate.
Anal.: Calcd. for $C_{17}H_{16}O_6N_4$: N, 15.1.
Found: N, 15.0.

The semicarbazone was crystallized twice from 50% alcohol and twice from 95% alcohol, M. P. 166–167° C.
Anal.: Calcd. for $C_{12}H_{15}O_3N_3$: C, 57.8; H, 6.02; N, 16.9.
Found: C, 58.0; H, 6.05; N, 16.9.

*Para-(alpha-hydroxyethyl) benzyl acetate.*—A mixture of 215 g. of para-acetylbenzyl acetate and 25 g. of copper chromite was shaken for six hours in standard equipment with hydrogen at an initial pressure of 2000 pounds. Reduction was effected at 135–155°. Upon cooling, the charge was removed from the bomb, filtered and the precipitate washed with benzene. Distillation of the filtrate yielded 184 g. (85) of crude para-(alpha-hydroxyethyl) benzyl acetate, B. P. 135–160°/3 mm.

*Para-(alpha-acetoxyethyl) benzyl acetate.*—A mixture of 48 g. of crude para-(alpha-hydroxyethyl) benzyl acetate, 24 g. of sodium acetate, and 480 cc. of acetic anhydride was heated at 100° for three hours and then allowed to stand overnight. The acetic anhydride was then distilled until the volume of the residue was reduced to 200 cc. before dilution with one liter of water. After it had stood one hour it was extracted three times with benzene. The combined extracts were washed three times with water. Distillation yielded 44 g. (75%) para-(alpha-acetoxyethyl)-benzyl acetate, B. P. 144–153°/3 mm., $n_D^{25}$ 1.4998, $d_{25}^{25}$ 1.114

Anal.: Calcd. for $C_{13}H_{16}O_4$: C, 66.1; H, 6.78; sap. equiv. 115.

Found: C, 66.0; H, 6.73; sap. equiv. 125, 123.

Specifically this invention provides the new compound corresponding to the formulae:

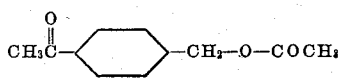

para-acetylbenzyl acetate, and

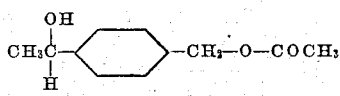

para-(alpha-hydroxyethyl)benzyl acetate, which are particularly valuable as intermediates for the production of polymeric materials.

The oxidation step to produce para-acetylbenzyl acetate may be carried out at atmospheric pressure or vacuum and even at moderate pressures, but I have discovered that the use of excessive pressure is detrimental in that the reaction will, under such conditions, proceed to a resinous form immediately and quantitatively.

The oxidation is carried out in the liquid phase by means of an oxygen-containing gas applied in the presence of an oxidizing catalyst. While the preparation of para-acetylbenzyl acetate from para-ethylbenzyl acetate has been described as occurring in the presence of a chromium oxide catalyst, I have found that any metal oxide or hydroxide may be used in place of the chromium oxide specifically described. The particular chromium oxide catalyst which I have found to be particularly efficacious is a mixture of this material with calcium carbonate in the weight ratio of 1:14. While I prefer to use air as the oxidizing medium, I may use pure oxygen or a prepared mixture of oxygen with an inert gas. Temperatures between 110° and 160° C. are suitable for reaction to be effected.

In view of the above, it will be seen that the several objects of the invention are achieved and other advantageous results obtained.

Since many changes could be made in the above methods and products without departing from the scope of the invention, it is intended that all matter contained in the above description shall be interpreted as illustrative and not in a limiting sense and that the invention is to be construed broadly and restricted solely by the scope of the appended claims.

What I claim is:

1. The compounds having the formula:

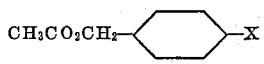

where X is selected from the class consisting of

and

2. The compound para-acetylbenzyl acetate.

3. The compound para-(alpha-hydroxyethyl)benzyl acetate.

4. The process for producing para-acetylbenzyl acetate which comprises contacting para-ethylbenzyl acetate in the liquid phase with gaseous oxygen in the presence of an oxidation catalyst.

5. The process defined in claim 4 in which the oxidation catalyst comprises $Cr_2O_3$.

6. The process for producing para-acetylbenzyl acetate which comprises contacting para-ethylbenzyl acetate in the liquid phase with gaseous oxygen in the presence of an oxidation catalyst comprising a mixture of $Cr_2O_3$ and $CaCO_3$.

7. The process defined in claim 6 in which the oxidation catalyst consists of four parts by weight of $CaCO_3$ and one part by weight of $Cr_2O_3$.

8. The process defined in claim 6 in which the oxidation catalyst is carried out at temperatures between 110° C. and 160° C.

9. The process for producing para-acetylbenzyl acetate which comprises contacting para-ethylbenzyl acetate in the liquid phase with air in the presence of an oxidation catalyst comprising a mixture of one part of $Cr_2O_3$ and four parts of $CaCO_3$ at a temperature between 110° C. and 160° C.

WILLIAM S. EMERSON

REFERENCES CITED

The following references are of record in the file of this patent:

UNITED STATES PATENTS

| Number | Name | Date |
|---|---|---|
| 2,156,721 | Simo et al. | May 2, 1939 |
| 2,302,466 | Palmer et al. | Nov. 17, 1942 |
| 2,376,674 | Emerson et al. | May 22, 1945 |
| 2,390,368 | Hockwalt | Dec. 4, 1945 |

OTHER REFERENCES

Verley: "Bull. Soc. Chem. de France," vol. 19, page 140 (1898).

Bennett et al.: "Chem. Abstracts," vol. 30 (1936), page 7559.

Grimaux: "Annalen der Chem.," vol. 155, page 342 (1870).